United States Patent
Weinmann

(10) Patent No.: US 7,096,464 B1
(45) Date of Patent: Aug. 22, 2006

(54) SOFTWARE UPDATE METHOD AND APPARATUS

(75) Inventor: Hermann Weinmann, Angelbachtal (DE)

(73) Assignee: SAP Aktiengesellschaft, (DE)

( * ) Notice: Subject to any disclaimer, the term of this patent is extended or adjusted under 35 U.S.C. 154(b) by 590 days.

(21) Appl. No.: 10/307,516

(22) Filed: Dec. 2, 2002

(51) Int. Cl.
G06F 9/44 (2006.01)

(52) U.S. Cl. ............... 717/169; 717/168; 717/172; 717/178

(58) Field of Classification Search ........ 717/101–178; 709/220; 715/745; 713/191
See application file for complete search history.

(56) References Cited

U.S. PATENT DOCUMENTS 6,009,274 A * 12/1999 Fletcher et al. ............ 717/173
6,771,290 B1 * 8/2004 Hoyle ........................ 715/745
2003/0145317 A1 * 7/2003 Chamberlain .............. 717/177
2003/0192029 A1 * 10/2003 Hughes ...................... 717/101
2004/0003266 A1 * 1/2004 Moshir et al. .............. 713/191
2004/0158817 A1 * 8/2004 Okachi et al. .............. 717/122
2004/0199615 A1 * 10/2004 Philyaw ..................... 709/220

OTHER PUBLICATIONS

SAP, "New personalized and collaborative functions in SAP services marketplace", 2002, 1 page.

* cited by examiner

Primary Examiner—Wei Zhen
Assistant Examiner—Mark P. Francis
(74) Attorney, Agent, or Firm—Fish & Richardson P.C.

(57) ABSTRACT

A method of automatically sending a pertinent software update to a user of an executable software application is disclosed. The method includes storing a plurality of software updates for the software application and ranking the pertinence of the individual software updates. At least one pertinent software update is selected from the plurality of software updates based on the ranking of the pertinence of the software update and automatically sent to the user.

24 Claims, 4 Drawing Sheets

SOFTWARE UPDATE METHOD AND APPARATUS

TECHNICAL FIELD

This invention relates to supplying software-related solutions using push and pull mechanisms.

BACKGROUND

It is often necessary to update a software application with a software patch or a bulletin explaining how to use the software application. A software application provider may develop updates for a software application on its own initiative or at the request of a user of the application. After developing the update, the application provider may send the update to a user. Sending an update to a user generally has been a reactive process, such that the update is only sent to the user after the user requests it, or after the user reports a problem with the application.

SUMMARY

In one general aspect, a method of automatically sending a pertinent software update to a user of an executable software application is disclosed. The method includes storing a plurality of software updates for the software application and ranking the pertinence of the individual software updates. At least one pertinent software update is selected from the plurality of software updates based on the ranking of the pertinence of the software update and automatically sent to the user.

Implementations may include one or more of the following features. For example, sending the pertinent software updates may include sending software that may be integrated into the executable software application. Sending the pertinent software updates may include sending a bulletin of instructions for altering the operation of the software application. Automatically sending the pertinent software update to the user may be performed without receiving a request from the user for a software update. Ranking the pertinence of the individual software updates may include ranking the individual software updates based on the judgment of an operator.

The method may also include generating statistical information about pertinence of the individual software updates, and the ranking of the pertinence of the individual software updates may be based, at least in part, on the statistical information. The generation of statistical information may include the generation of information about how often each of the stored software updates were sent to users in a particular time period. In addition to basing the ranking on the statistical information, the ranking may be further based on the judgment of an operator.

The method may further include selecting the pertinent software update based on a criterion for determining the pertinence of the software update to the user, and the criterion may be determined by the user, or the criterion may be related to a determination of whether a pertinent software update has already been sent to the user.

The method may further include sending a message to the user containing information the user may use to initiate the sending of the software update to the user and receiving confirmation from the user in response to the message to initiate the sending of the software update. The method may further include maintaining a database of users of the executable software application who may wish to receive a software update.

In another general aspect, a system for automatically sending a pertinent software update to a user of an executable software application is disclosed. The system includes memory for storing a plurality of software updates for the software application and a processor. The processor is configured to execute instructions for ranking the pertinence of the individual software updates and configured to execute instructions for selecting at least on pertinent software update from the plurality of software updates based on the ranking of the pertinence of the software update and for automatically sending the selected pertinent software update to the user.

Implementations may include one or more of the following features. For example, the software update may include software that may be integrated into the executable software application. The software update may include a bulletin of instructions for altering the operation of the software application. Automatically sending the pertinent software update to the user may be performed without receiving a request from the user for a software update. The ranking may be based on the judgment of an operator.

The processor may be further configured to execute instructions for generating statistical information about pertinence of the individual software updates, and the ranking may be based at least in part on the statistical information. The statistical information may include information about how often each of the stored software updates were sent to users in a particular time period. In addition to basing the ranking on the statistical information, the ranking may be further based on the judgment of an operator.

The processor may be further configured to execute instructions for selecting the pertinent software update based on a criterion for determining the pertinence of the software update to the user. The criterion may be determined by the user. The processor may be further configured to execute instructions for determining if the software update has already been sent to the user.

The processor may be further configured to execute instructions for sending a message to the user containing information the user may use to initiate the sending of the software update to the user and to execute instructions for receiving data from the user in response to the message to initiate the sending of the software update.

The system may further include a memory for storing a database of users of the executable software application who may wish to receive a software update.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
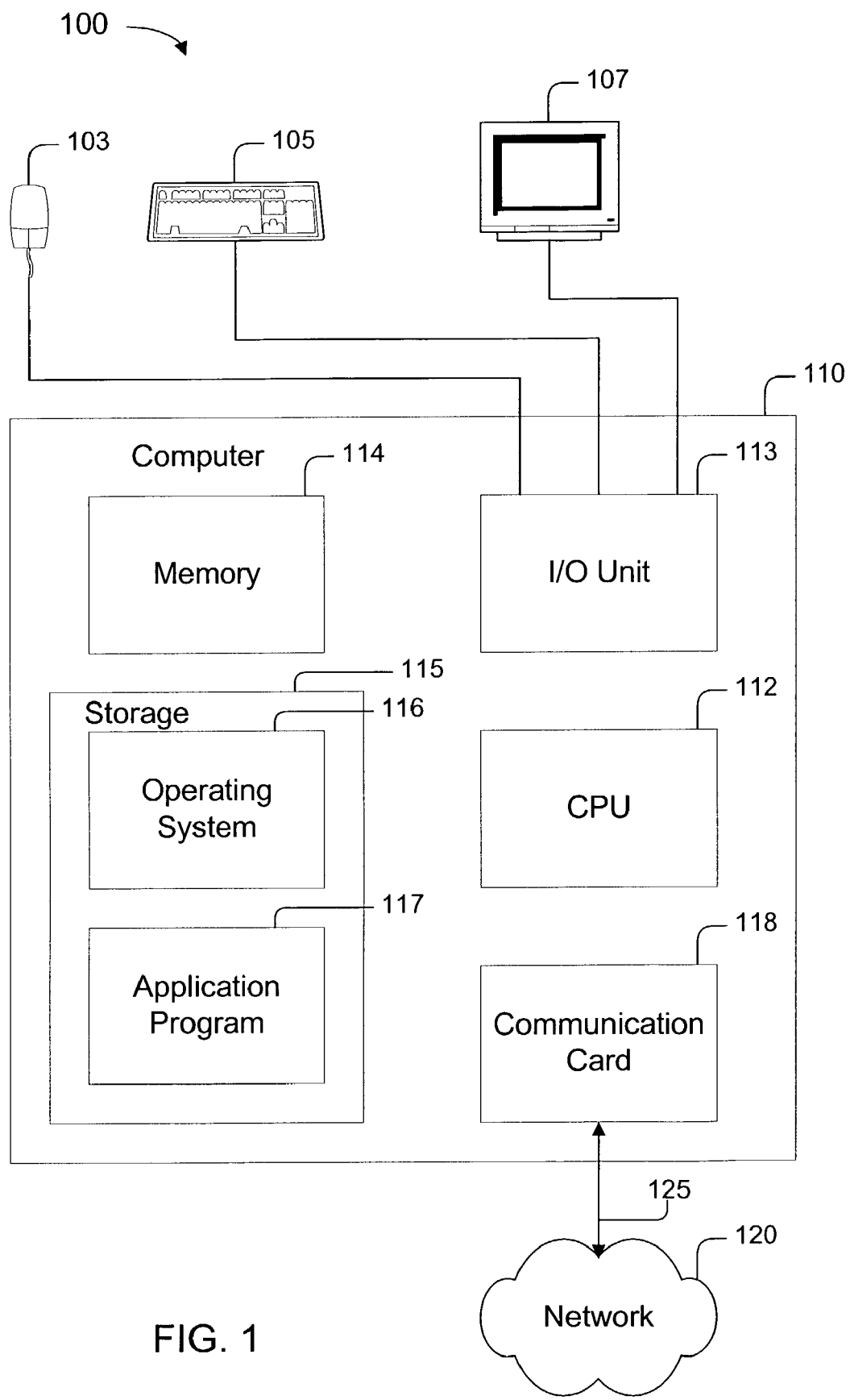
FIG. 1 is a schematic diagram of a system for automatically sending an update for a software application.

Referring to FIG. 1, exemplary components of a system 100 that may be used to automatically send software updates include various input/output (I/O) devices (e.g., mouse 103, keyboard 105, and display 107) and a general purpose computer 110 having a central processor unit (CPU) 112, an I/O unit 113, memory 114, and a storage device 115. Storage device 115 may store machine-executable instructions, data, and various programs, such as an operating system 116 and one or more application programs 117, all of which may be processed by CPU 112. Each computer application may be implemented in a high-level procedural or object-oriented programming language, or in assembly or machine language if desired. The language may be a compiled or interpreted language. Data storage device 115 may be any form of non-volatile memory, including, for example, semiconductor memory devices, such as Erasable Programable Read-Only Memory (EPROM), Electrically Erasable Programable Read-Only Memory (EEPROM), and flash memory devices; magnetic disks such as internal hard disks and removable disks; magneto-optical disks; and Compact Disc Read-Only Memory (CD-ROM).

Computer system 110 may also include a communications card or device 118 (e.g., a modem or a network adapter) for exchanging data with a network 120 through a communications link 125 (e.g., a telephone line, a wireless network link, a wired network link, or a cable network). Other systems, such as a computer system, similar to the system shown in FIG. 1, may be connected to computer system 110 through network 120 and may exchange data, information, and instructions with computer system 110. Other examples of system 100 include a handheld device, a workstation, a server, a device, a component, other equipment of some combination thereof capable of responding to and executing instructions in a defined manner. Any of the foregoing may be supplemented by, or incorporated in, application-specific integrated circuits (ASICs).

Figure 2:
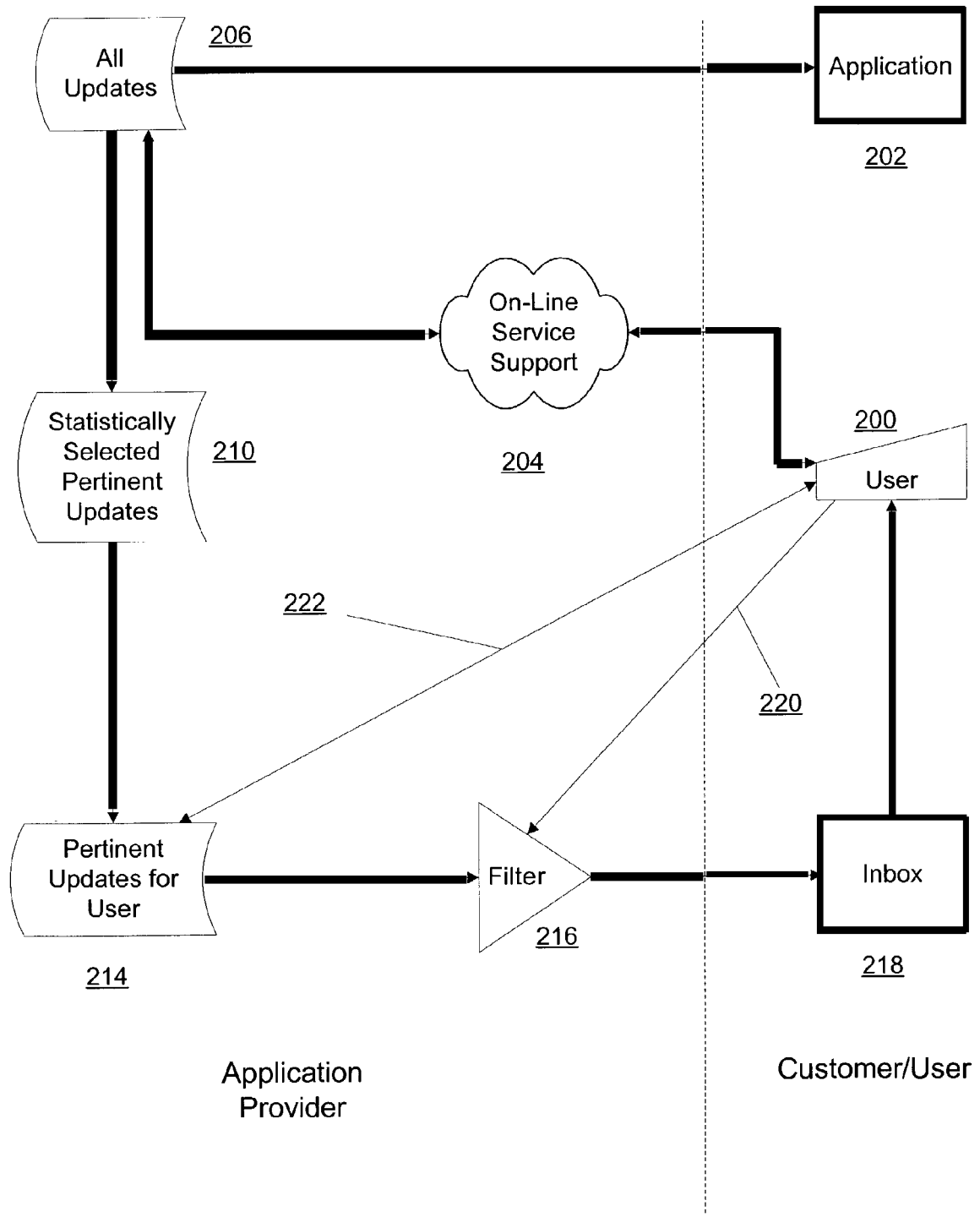
FIG. 2 is a block diagram of a system that automatically sends a pertinent update from a software application provider to a customer or user.

FIG. 2 shows a system that automatically sends a pertinent update from a software application provider to a user or system administrator 200 of a software application 202. A user 200 of the application may experience problems with the application 202 and may contact the application provider for assistance or support. The user 200 may contact the on-line support service ("OSS") 204 of the application provider for assistance and support. When the user 200 contacts the OSS 204, the application provider may require the user to provide information about the problem experienced with the application. For example, the application provider may require that the user 202 provide the OSS 204 with information about the user's name or organization, the application 202 being run by the user, what other applications the user is running, when the problem occurred, whether the problem was a fatal error that caused the application 202 to cease running or whether the user is merely seeking to optimize the running of the application 202. Such information may be provided from the user 200 to the OSS 204 through one or more pre-defined choices available in a user interface to the OSS 204. The user may select the relevant predefined choices from many options by, for example, clicking on the relevant choices. The application provider may receive and store this information along with the time the user contacted the application provider.

The OSS 204 may respond to the user's inquiry by locating a relevant software patch, bulletin, update, warning, frequently asked question ("FAQ") or solution (which may collectively be referred to as an "update" or "note"), and sending the update to the user to apply to the application 202. The update is generally intended to improve the performance of the application 202 and/or solve the user's problem with the application 202. If the update sent by the application provider to the user solves the user's problem with the software application 202 or is otherwise helpful to the user, the application provider may receive a message from the user that the update successfully was responsive the user's problem. The application provider, particularly the on-line support service division of the application provider, may record that the update was sent at a particular time and was responsive to a user's particular problem with a particular software application 202.

As many users of the application provider's software applications contact the OSS 204 to receive updates to the software applications, the application provider records information about the users' needs each time a user 200 contacts the OSS 204 and each time an update is provided to the user. This information may be used to generate statistical information about the updates that are most useful or pertinent to a user 200 or a software application 202. For example, a large software application provider may have hundreds of thousands of pre-existing updates that it may send to users of its software applications. The application provider may determine, based on the information gathered during interactions with many users 200 seeking assistance with their software applications 202, that a number of the many available updates are most responsive to the needs of the users. For example, the application provider may determine that the updates that have been sent most frequently in a recent time period are the most pertinent updates for customers and users of an application. Based on this statistical information, the application provider may select one or more updates from the available updates as the most pertinent and useful updates. For example the ten most frequently sent updates in the previous month may be selected as the ten most pertinent updates for that month and grouped together in a common classification 210. The statistically determined list of pertinent updates 210 may be manually modified or updated by a person at the application provider and a final list of the most pertinent updates may be generated and grouped together in a common classification of pertinent updates 214. Manual updating of the statistically generated list of updates 210 may be necessary, for example, if a particularly critical update becomes available after the time period within which the statistical information about the pertinence of the available updates was generated, or if an update on the statistically generated list of updates 210 becomes obsolete or otherwise irrelevant to a user 200.

Pertinent updates 214 may be classified and/or aggregated together in one or more groups. For example, a system-wide group of updates may aggregate the updates that have been sent most often from the application provider to all users of any of the application provider's products. A more narrowly-focused group of updates may aggregate the updates pertinent to a particular application, and still more narrowly-focus group of updates may aggregate updates related to a particular component of a particular application.

The application provider may automatically provide the pertinent updates 214 to a user 200 without the user requesting an update or reporting a problem to the application provider. A pertinent update may be provided to a user 200 by sending an electronic mail message to the user's inbox 218 informing the user that a pertinent update is available and may be downloaded and installed by the user. For example, the electronic mail message may contain a hyperlink on which the user 200 may click to initiate the transfer of the update from the application provider to the user.

The user 200 may maintain a filter 216 for screening the transmission of the pertinent software updates chosen by the application provider 214 to ensure that the user only receives notification of updates that are of particular interest or pertinence for the user. The user 200 may communicate through a communication link 220 with software maintaining the user's filter settings and may set the parameters of the filter to allow only the transmission of updates related to software applications the user has installed. For example, the application provider may sell many applications and may generate pertinent updates 214 related to many different applications. However, the user 200 may be only interested in updates for applications the user has installed, and may not wish to receive updates related to the other applications. Additionally, the user 200 may set parameters of the filter 216 to allow only the transmission of updates related to the customer's particular area of interest. For example, the application provider may sell a customer relationship management ("CRM") suite of software applications to many customers, and a large number of those customers may have problems with a portion of the suite that manages call center interactions with a customer, such that they contact the OSS 204 and receive a particular update to solve their problems with the call center interaction center from the application provider. If the update is provided often to the customers, it may be automatically selected as a pertinent update 214 for sending to all users of the CRM suite. However, if a particular customer does not use a call center for fielding customer inquiries, any updates to the call center interaction portion of the CRM suite may be irrelevant and of no interest to the particular customer. In such an example, the filter 216 allows a user 200 to block the sending of any updates related to the call center interaction portion of the suite.

A filter 216 may also provide the application provider with useful information about the needs of the users of the application provider's products. Through the filter 216 the application provider may obtain information about a user's interest areas, and may use this information, for example, for marketing purposes.

A user 200 may view the pertinent updates 214 that have been provided to him through the filter 216, but the user also may wish to know what other updates are available. For example, if the user 200 has subscribed to a mailing list to receive pertinent updates 214 about a particular application, the user may also wish to check the availability of updates related to all applications sold by the application provider, or the user may wish to check the availability of updates related to a particular implementation of the application for which he is automatically receiving updates. The user 200 may link directly to these lists of updates 214 through a communications link 222 and may download desired updates.

Figure 3:
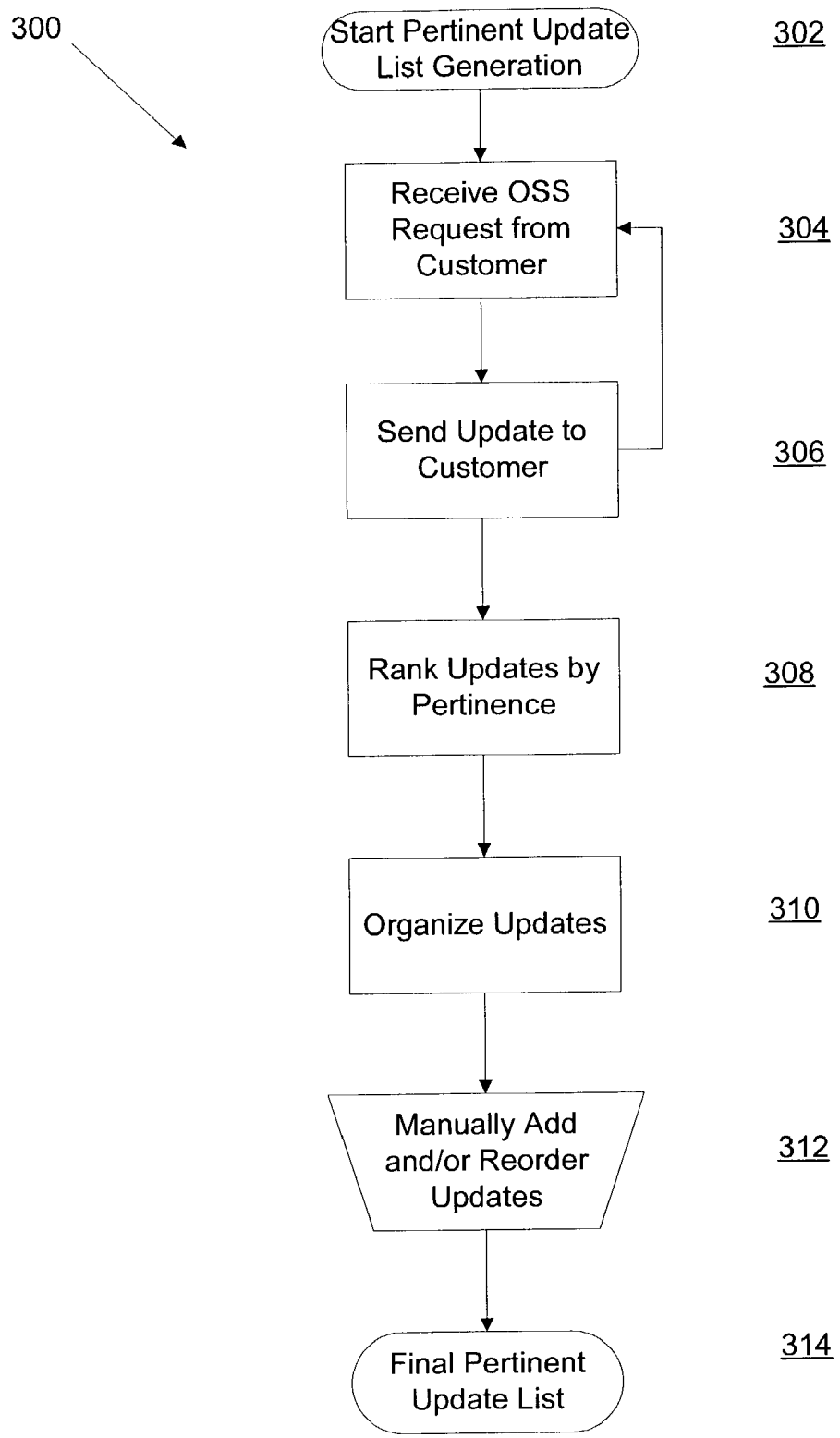
FIG. 3 is a flow chart of a process for automatically generating a list of software updates that are pertinent to a user of a software application.

FIG. 3 shows a flow chart of a process 300 for automatically generating a list of pertinent updates 214 (FIG. 2) to a user 200 (FIG. 2) of a software application. Referring now to FIGS. 2 and 3, the process begins (step 302). An application provider receives a help request from a user 200 of one of the applications it has provided 202 (step 304). The application provider sends an update 206 to the user 200 and records the nature of the user's help request, that an update was sent, the topic and the nature of the update, and the time the update was sent. The receiving of help request (step 304) and the sending of updates (step 306) may occur multiple times. Information gathered during the receiving of help request (step 304) and the sending of updates (step 306) is used to rank automatically the pertinence of the updates (step 308). For example, the updates 206 that are sent most often in a particular time period may be ranked as the most pertinent updates for customers of the application provider and users of the application provider's software applications. The pertinent updates may be organized into one or more groups that may be related (step 310). For example, a system-wide group of updates may link the updates that have been sent most often from the application provider to all users of the application provider's products. A more narrowly-focused group of updates may link the updates pertinent to a particular application, and still more narrowly-focus group of updates may link updates related to a particular implementation or aspect of a particular application. The groups of automatically determined pertinent updates 210 may be manually updated or reordered (step 312) if the a person determines that the automatically generated groups and ranks do not represent the most pertinent updates for users 200 of software applications 202. After manual reorganization, final groups of pertinent updates 214 are generated (step 314) for providing to users 200.

Figure 4:
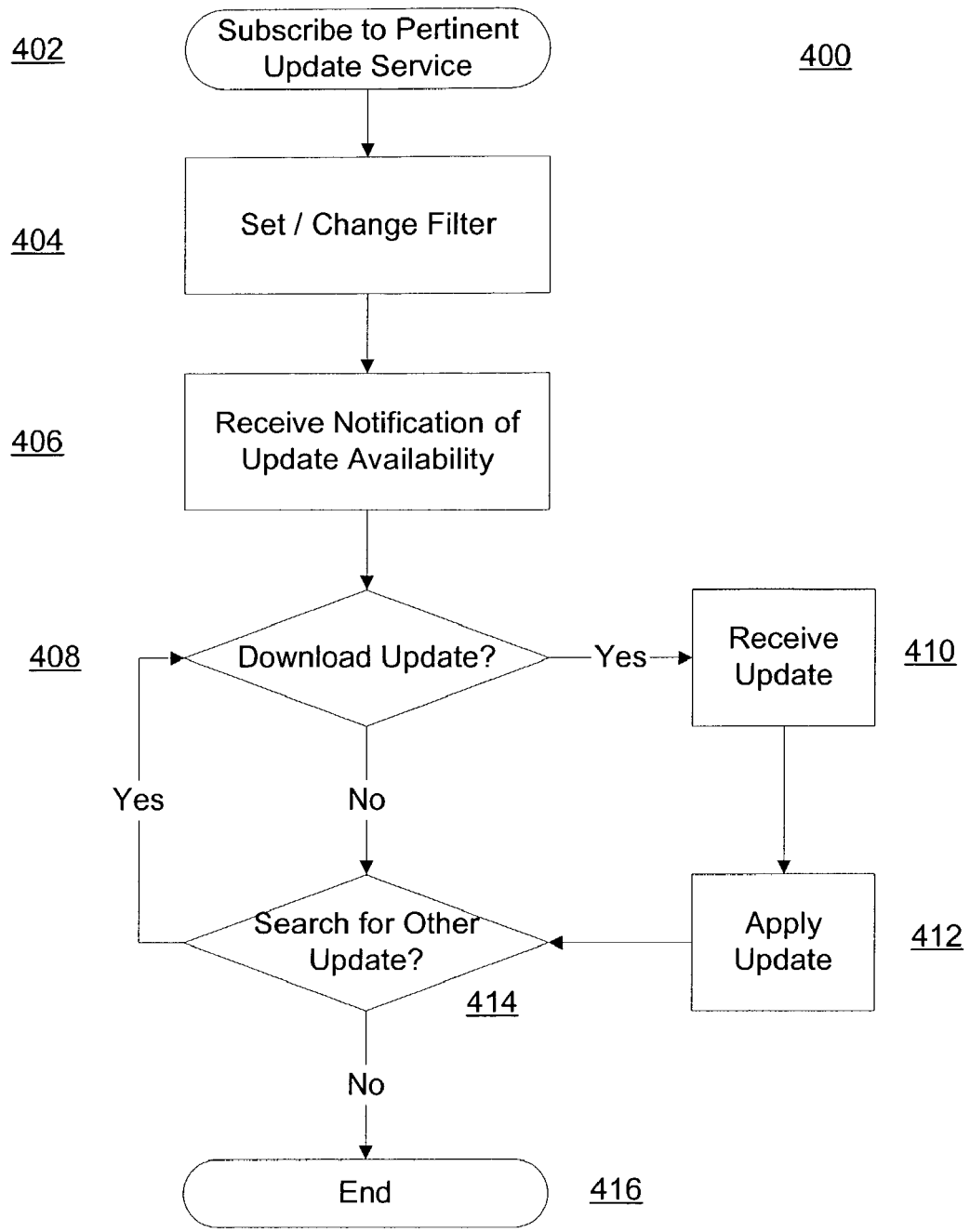
FIG. 4 is a flow chart of a process for receiving and applying a pertinent update received from a software application provider.

FIG. 4 is a flow chart of a process 400 for receiving and applying a pertinent update received from a software application provider. Referring now to FIGS. 2 and 4, the process begins when the user 200 of the software application subscribes to a service for automatically providing software updates (step 402). The user 200 sets, or changes the settings of, a filter 216 for screening the pertinent updates 214 received from the application provider. The user 200 receives a notification that a pertinent software update 214 is available from the application provider (e.g., by electronic mail) (step 406) and may choose to download the update from the application provider (step 408). This notification is an example of a push mechanism. If the user 200 chooses to download the update the user receives the update (step 410) (e.g., by clicking on a on a hyperlink contained in the electronic mail notification to initiate the download of the update). After receiving the update (step 410), the user applies the update to the user's software application 202 (step 412). Application of the update 214 (step 412) may include installation of a software patch downloaded from the application provider, installation of an application extension, other modification of the software application 202, or receipt of information concerning the software application. If the user 200 opts not to download an update of which he has received a notification in step 406, the user may opt to search for other updates that may be of interest to the user 200 (step 414) and to download, receive, and apply an other update. Such a search and download by the user is an example of a pull mechanism. If the user 200 opts not to download or search for any other updates, the process terminates (step 416).

A number of implementations have been described. Nevertheless, it will be understood that various modifications may be made without departing from the spirit and scope of the following claims.

What is claimed is:

1. A method of sending a pertinent software update to a user of an executable software application, comprising:
    storing a plurality of software updates for the software application;
    generating statistical information about pertinence of each of the plurality of software updates;
    determining a ranking of pertinence for each of the plurality of software updates based on information received from multiple users of the executable software application, wherein the ranking of pertinence comprises a level of importance, and wherein determining the ranking of pertinence for each of the plurality of software updates comprises ranking each of the plurality of software updates based, at least in part, on the statistical information;

selecting a first software update from the plurality of software updates based on the ranking of pertinence determined for the first software update; and automatically sending the first software update to the user.

2. The method of claim 1, wherein automatically sending the first software update comprises sending software that may be integrated into the executable software application.

3. The method of claim 1, wherein automatically sending the first software update comprises sending a bulletin of instructions for altering the operation of the software application.

4. The method of claim 1, wherein automatically sending the first software update to the user is performed without receiving a request from the user for a software update.

5. The method of claim 1, wherein determining a ranking of pertinence for each of the plurality of software updates comprises ranking the individual software updates based on a judgment of an operator.

6. The method of claim 1, wherein generating statistical information comprises generating information about how often each of the plurality of software updates were sent to users in a particular time period.

7. The method of claim 1, wherein determining a ranking of pertinence for each of the plurality of software updates comprises ranking each of the individual software updates based on a judgment of an operator.

8. The method of claim 1, further comprising selecting the first software update based on a criterion for determining a pertinence of the software update to the user.

9. The method of claim 8, wherein selecting the first software update comprises selecting the update based on a criterion determined by the user.

10. The method of claim 8, further comprising determining if the first software update has already been sent to the user.

11. The method of claim 1, further comprising:
sending a message to the user containing information the user may use to initiate a sending of the first software update to the user; and
receiving confirmation from the user in response to the message to initiate the sending of the first software update.

12. The method of claim 1, further comprising maintaining a database of users of the executable software application who may wish to receive a software update.

13. A system for sending a pertinent software update to a user of an executable software application, comprising:
memory for storing a plurality of software updates for the software application;
a processor configured to execute instructions for determining a ranking of pertinence for each of the plurality of software updates based on information received from multiple users of the executable software application, wherein the ranking of pertinence comprises a level of importance, and configured to execute instructions for selecting a first software update from the plurality of software updates based on the ranking of pertinence determined for the first software update and for automatically sending the first software update to the user;
wherein the processor is further configured to execute instructions for generating statistical information about pertinence of the plurality of software updates; and
wherein the ranking is based, at least in part, on the statistical information.

14. The system of claim 13, wherein the first software update comprises software that may be integrated into the executable software application.

15. The system of claim 13, wherein the first software update comprises a bulletin of instructions for altering the operation of the software application.

16. The system of claim 13, wherein the processor is further configured to automatically send the first software update to the user without receiving a request from the user for a software update.

17. The system of claim 13, wherein the ranking is based on a judgment of an operator.

18. The system of claim 13, wherein the statistical information comprises information about how often each of the plurality of software updates were sent to users in a particular time period.

19. The system of claim 13, wherein the ranking is further based on a judgment of an operator.

20. The system of claim 13, wherein the processor is further configured to execute instructions for selecting the pertinent software update based on a criterion for determining the pertinence of the software update to the user.

21. The system of claim 20, wherein the criterion is determined by the user.

22. The system of claim 20, wherein the processor is further configured to execute instructions for determining if the first software update has already been sent to the user.

23. The system of claim 13, wherein the processor is further configured to:
execute instructions for sending a message to the user containing information the user may use to initiate the sending of the first software update to the user; and
execute instructions for receiving data from the user in response to the message to initiate the sending of the first software update.

24. The system of claim 13, further comprising memory for storing a database of users of the executable software application who may wish to receive a software update.

* * * * *